US006474190B1

(12) United States Patent
Choo

(10) Patent No.: US 6,474,190 B1
(45) Date of Patent: Nov. 5, 2002

(54) HOOD UNLOCKING APPARATUS OF AUTOMOBILE

(75) Inventor: Jin-Su Choo, Ulsan (KR)

(73) Assignee: Hyundai Motor Company, Seoul (KR)

(*) Notice: Subject to any disclaimer, the term of this patent is extended or adjusted under 35 U.S.C. 154(b) by 49 days.

(21) Appl. No.: 09/672,268

(22) Filed: Sep. 28, 2000

(30) Foreign Application Priority Data

Dec. 16, 1999 (KR) ........................................... 99-58235

(51) Int. Cl.[7] ............................... E05B 3/00; F16C 1/10

(52) U.S. Cl. .................... 74/502.4; 74/500.5; 74/501.6; 292/336.3; 292/348

(58) Field of Search ......................... 74/501.5 R–502.6, 74/523, 543; 292/336.3, 348, DIG. 23, DIG. 62, DIG. 25

(56) References Cited

U.S. PATENT DOCUMENTS 3,601,434 A * 8/1971 Fargo ......................... 292/46
3,893,207 A * 7/1975 Rudaitis et al. ........... 180/69 C
4,382,482 A * 5/1983 Brandl et al. ............. 180/69 R
4,958,536 A * 9/1990 Baumgarten ........... 74/501.5 R
4,991,884 A * 2/1991 Cairns ......................... 292/28
6,092,845 A * 7/2000 Koenig ....................... 292/225
6,234,041 B1 * 5/2001 Larabet et al. ................ 74/523
6,264,257 B1 * 7/2001 Meinke ................... 292/336.3

* cited by examiner

*Primary Examiner*—Vinh T. Luong
(74) *Attorney, Agent, or Firm*—Christie, Parker & Hale, LLP

(57) ABSTRACT

A hood unlocking apparatus of an automobile is provided adapted to unlock a hood of the automobile via a wire, the apparatus comprising a fixing bracket mounted at an inner side panel of the automobile and a rocking bracket formed with a handle for pulling the wire and having one side thereof fixed to the wire while the other side thereof is hitched via a pin and a spring.

9 Claims, 4 Drawing Sheets

HOOD UNLOCKING APPARATUS OF AUTOMOBILE

BACKGROUND OF THE INVENTION

1. Field of the Invention

The present invention relates to a hood unlocking apparatus of an automobile.

2. Description of the Prior Art

As illustrated in FIG. 1, an automobile is equipped with a front hood installed at a front side where an engine is mounted and a rear hood installed at the trunk.

The front hood is generally equipped with a dual safety device. In other words, only after the hood is initially unlocked inside the automobile, the hood can be then lifted outside as illustrated in FIG. 1.

FIG. 2 illustrates a position where a hood unlocking apparatus for initially unlocking the front hood is located inside an automobile. As illustrated, the hood unlocking apparatus is frontly located underneath a crash pad 12, where a hood 2 is initially unlocked by a forward pulling of an unlock handle 18. A hood unlocking apparatus shown in FIG. 3 is coupled at a front lower part of the crash pad 12 holding various instruments with a housing 16 via a reinforcing member 14, where the housing 16 is mounted with an unlock handle 18 having a restoring force by way of torsion spring 20. The unlock handle 18 is connected to a cable 24 wrapping a wire 22 and when the unlock handle 18 is pulled, the wire 22 is successively pulled to open a hood (not shown).

The reinforcing member 14 is coupled to the housing 16 and the crash pad 12 by way of coupling members 26 and 28.

However, there are problems in the conventional hood unlocking apparatus thus described in that, when the unlock handle 18 is pulled, the crash pad 12 is swung to adversely affect various instruments on the crash pad 12, and in that the way the unlock handle 18 is connected therein with the wire 22 makes it difficult to work on assembling cables.

There is another problem in that a fuse box and an engine check point are positioned around the unlock handle 18 in some types of automobiles, such that it is difficult to operate the conventional hood unlock apparatus.

SUMMARY OF THE INVENTION

The present invention is disclosed to solve the aforementioned problems and it is an object of the present invention to provide a hod unlocking apparatus for an automobile adapted to enable an easy assembly and to prevent a crash pad from swinging, providing no adverse effect to instruments thereon.

In accordance with the object of the present invention, there is provided a hood unlocking apparatus of an automobile, the apparatus comprising:

an inner side panel, a fixing bracket mounted at the inner side panel, a rocking bracket rotably coupled to the fixing bracket, a handle mounted at the rocking bracket, restoring means for restoring the rocking bracket to its original place after the rocking bracket is rotated by manipulation, and a wire connected at one end thereof to the rocking bracket and connected at the other end thereof to a hood to cooperatively move according to rotary movement of the rocking bracket.

Protruders are respectively formed at both sides of the rocking bracket, each at a predetermined angle, as restricting means for restricting a rotating angle thereof when the rocking bracket is rotated relative to the fixing bracket. It is preferred to mount a bumper to the protruders in order to reduce contact noise generated by contact with the fixing bracket. The rocking bracket is formed with a handle and a tip end of the wire is connected to the rocking bracket via a cushioning member to smoothen manipulation of the handle.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Now, preferred embodiment of the present invention will be described in detail with reference to the accompanying drawings.

Figure 1:
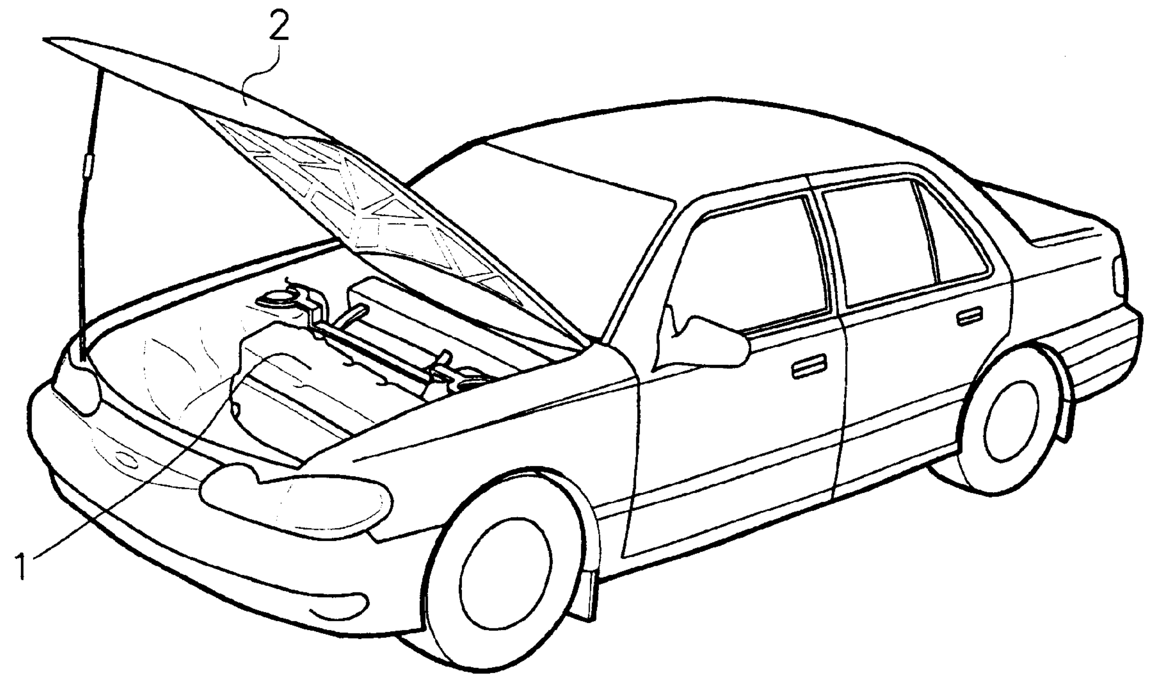
FIG.1 (prior art)
FIG. 1 is a perspective view for illustrating an opened state of a hood of an automobile.
Figure 2:
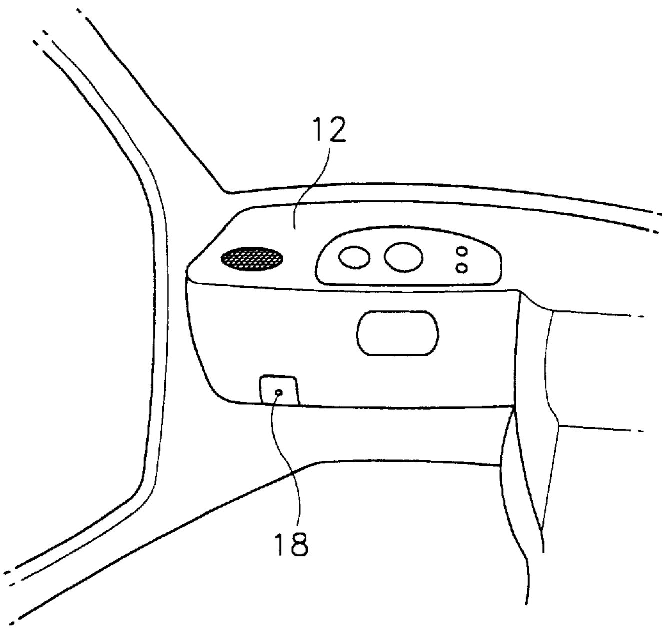
FIG.2 (prior art)
FIG. 2 is a perspective view for illustrating a position where a conventional hood unlocking apparatus is mounted in an automobile.
Figure 3:
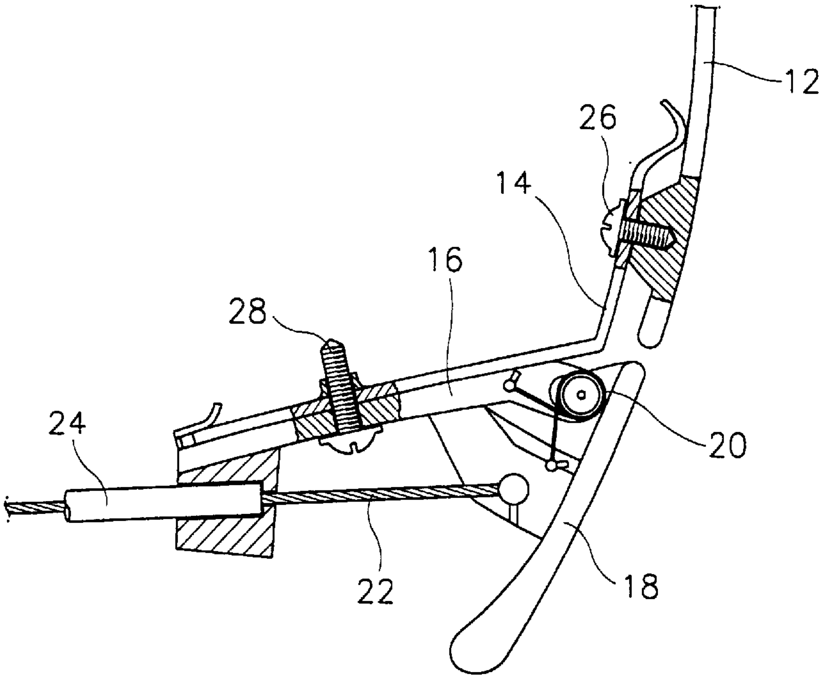
FIG.3 (prior art)
FIG. 3 is a constitutional diagram of the conventional hood unlocking apparatus in FIG. 2.
Figure 4:
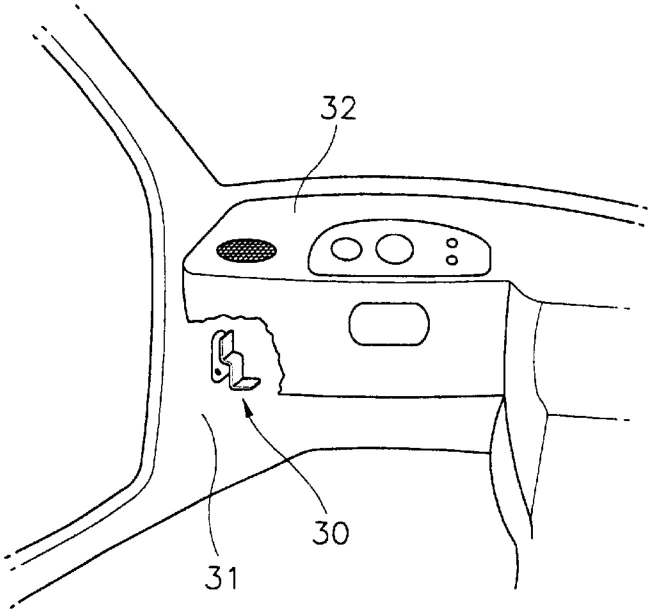
FIG. 4 is a perspective view for illustrating a position where a hood unlocking apparatus is mounted in an, automobile according to the present invention.
Figure 5:
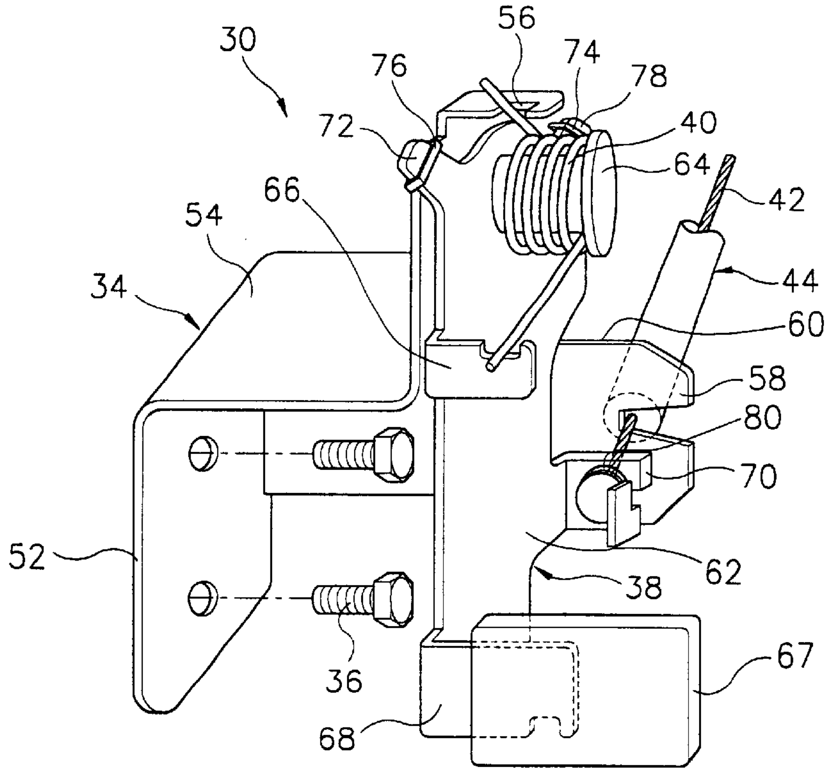
FIG. 5 is a constitutional diagram of the hood unlocking apparatus of FIG. 4.

As illustrated in FIG. 4, a hood unlocking apparatus 30 according to the present invention is mounted at an inner surface of an inner side panel 31, that is, positioned underneath a crash pad 32.

The hood unlocking apparatus 30 is mounted with a fixing bracket 34 which is in turn coupled to the inner side panel 31 by way of a bolt 36 where a rocking bracket 38 is rockingly mounted via a torsion spring 40 relative to the fixing bracket 34 and a cable 44 through which wire 42 passes is fixed at one end thereof to the rocking bracket 38.

The fixing bracket 34 includes a fixing unit 52 where the bolt 36 is inserted for fixation, a bend unit 54 horizontally bent at an upper end of the fixing unit 52 and again bent upward to form an angled shape, a first hitching unit 56 extensively and horizontally bent at a vertical portion of the bend unit 54 to allow a straight end of the torsion spring 40 to be hitched thereat and an extension flange 60 erectly extended at a rear side of the fixing unit 52 and having a hitching groove 58 at which a coated portion of the cable 44 is hitched at a tip end thereof.

The rocking bracket 38 is mounted with a base unit 62 which is in turn protrusively formed with a pin unit 64 around which the torsion spring 40 is inserted, where the base unit 62 is protrusively formed at a front middle portion thereof with a second hitching unit 66 at which the other straight part of the torsion spring 40 is hitched, while the base 62 is protrusively formed at a front lower portion thereof with a handle 68 in which a knob 67 is inserted and is again protrusively formed at a rear portion thereof with a fixer 70 at which the wire 42 is fixed.

Furthermore, the rocking bracket 38 is formed at both upper sides of the first hitching unit 56 with the protruders 72 and 74 so as to rock or swing within a predetermined angle. The protruders 72 and 74 are coupled to bumpers 76 and 78 to reduce noise generated by contact with the first hitching unit 56.

The wire 42 is fixed at one end thereof to the fixing unit 70 via a cushioning member 80 in order to reduce noise and hard feeling when the handle 68 is manipulated.

Figure 6:
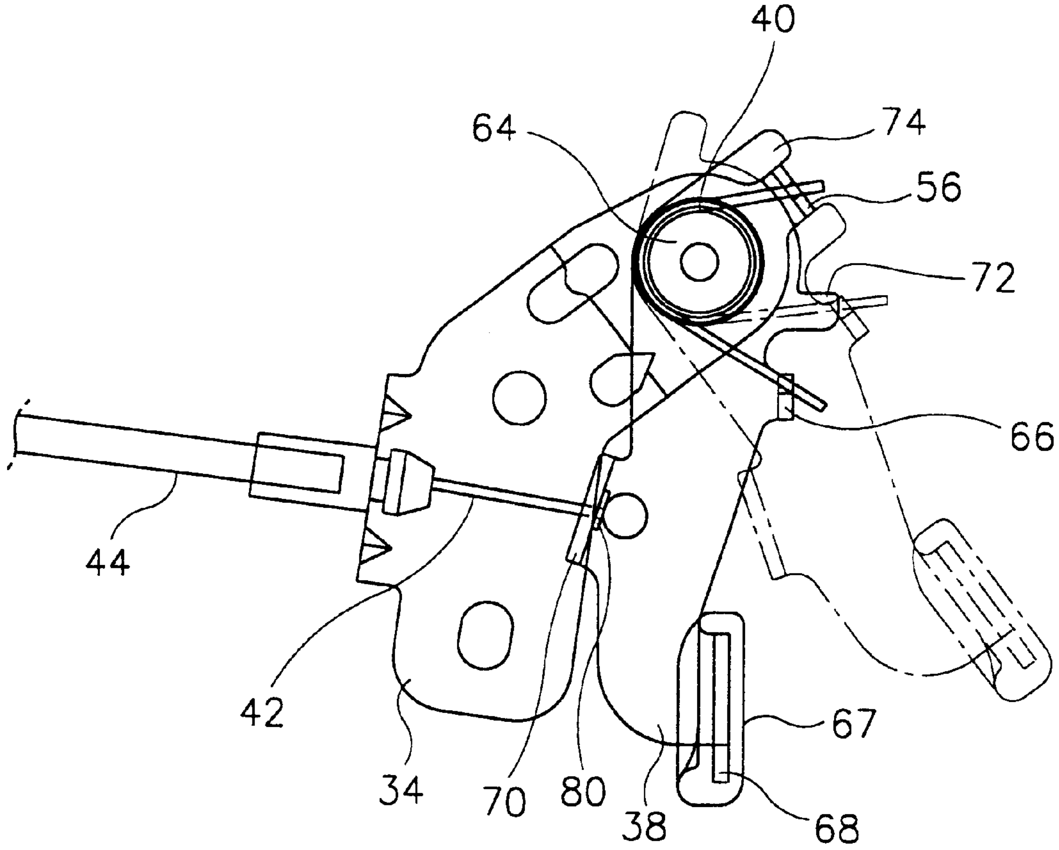
FIG. 6 is an operational constitutional diagram of the hood unlocking apparatus according to the present invention.

An operational constitutional diagram of the hood unlocking apparatus thus constructed according to the present invention is illustrated in FIG. 6, where, the torsion spring 40 is hitched at an upper straight portion thereof by the first hitching unit 56 of the fixing bracket while the torsion spring 40 is. hitched at a lower straight portion thereof by the second hitching unit 66 of the rocking bracket. The protruder 74 of the rocking bracket is restricted in motion thereof by the first hitching unit 56 of the fixing bracket.

When the knob 67 is pulled to the right side, the rocking bracket 38 is rotated around the pin unit 64 at a predetermined angle.

At this time, when the protruder 72 touches the first hitching unit 56 of the fixing bracket, the rocking bracket 38 is not rotated any more. The wire 42 is then pulled upto a predetermined length to open the hood. When the knob 67 is released, the rocking bracket 38 is returned to its original position by the resilient restoring force of the torsion spring 40.

As apparent from the foregoing, there is an advantage in the hood unlocking apparatus of automobile thus described according to the present invention in that a cable and a torsion spring are easy to install, thus, improving the assembly process. There is another advantage in that no shaking of the crash pad due to manipulation of the knob occurs during operation of the unlocking apparatus thereby causing no bad effects to the instruments.

What is claimed is:

1. A hood unlocking apparatus of an automobile, the apparatus comprising:

an inner side panel;

a fixing bracket mounted at the inner side panel;

a rocking bracket rotably coupled to the fixing bracket about an axis transverse to the inner side panel;

a handle extending from the rocking bracket;

restoring means for restoring the rocking bracket to its original place after the rocking bracket is rotated relative to the fixing bracket; and a wire connected at one end thereof to the rocking bracket and connected at the other end therefor to a hood to cooperatively move according to rotary movement of the rocking bracket.

2. The apparatus as defined in claim 1, wherein the rocking bracket is rotably coupled to the fixing bracket via a pin.

3. The apparatus as defined in claim 2, wherein the restoring means comprises a torsion spring inserted around the pin, where the torsion spring is fixed at a first end portion thereof to the fixing bracket while the torsion spring is fixed at a second end portion thereof to the rocking bracket.

4. The apparatus as defined in claim 3, wherein the fixing bracket comprises a first hitching unit and wherein the rocking bracket comprises a second hitching unit, wherein the first end portion of the torsion spring is hitched by the first hitching unit and the second end portion of the torsion spring is hitched by the second hitching unit.

5. The apparatus as defined in claim 4, wherein the rocking bracket further comprises restricting means for limiting the the rotation of the rocking bracket relative to the fixing bracket.

6. The apparatus as defined in claim 5, wherein the restricting means comprises a plurality of protruders protrusively formed and each extending from the rocking bracket at a predetermined angle for contacting the first hitching unit when the rocking bracket is rotated relative to the fixing bracket.

7. The apparatus as defined in claim 6, further comprising a bumper coupled to each protruder for reducing noise generated by contact with the first hitching unit.

8. A hood unlocking apparatus of an automobile, the apparatus comprising:

an inner side panel;

a fixing bracket mounted at the inner side panel, the fixing bracket comprising a first hitching unit;

a rocking bracket rotably coupled to the fixing bracket via a pin, the rocking bracket comprising a second hitching unit and a plurality of protruders each extending form the rocking bracket at a predetermined angle for contacting the hitching unit when the rocking bracket is rotated relative to the fixing bracket;

a handle extending from the rocking bracket;

a torsion spring surrounding the pin for restoring the rocking bracket to its original place after the rocking bracket is rotated relative to the fixing bracket, wherein a first end portion of the torsion spring is hitched by the first hitching unit and a second end portion of the torsion spring is hitched by the second hitching unit; and a wire connected at one end thereof to the rocking bracket and connected at another end therefor to a hood to cooperatively move according to rotary movement of the rocking bracket.

9. The apparatus as defined in claim 8, further comprising a bumper coupled to each protruder for reducing noise generated by contact with the first hitching unit.

* * * * *